United States Patent
Iodice et al.

(10) Patent No.: US 6,693,270 B2
(45) Date of Patent: Feb. 17, 2004

(54) CURRENT MODE ANALOG SIGNAL MULTIPLEXING BUS AND A METHOD THEREOF

(75) Inventors: Robert Iodice, Syracuse, NY (US); Matthew Pace, Homer, NY (US); Jeffrey Zarnowski, McGraw, NY (US)

(73) Assignee: Silicon Video, Inc., Ithaca, NY (US)

( * ) Notice: Subject to any disclaimer, the term of this patent is extended or adjusted under 35 U.S.C. 154(b) by 0 days.

(21) Appl. No.: 10/016,147

(22) Filed: Oct. 26, 2001

(65) Prior Publication Data

US 2002/0092969 A1 Jul. 18, 2002

Related U.S. Application Data

(63) Continuation-in-part of application No. 09/490,374, filed on Jan. 24, 2000, now Pat. No. 6,590,198, which is a continuation-in-part of application No. 09/039,835, filed on Mar. 16, 1998, now Pat. No. 6,084,229.

(51) Int. Cl.[7] ............................................. H01L 27/00
(52) U.S. Cl. ................ 250/208.1; 250/214 R
(58) Field of Search ................ 250/208.1, 214 R, 250/214 A, 214 LA; 257/290–293; 348/294, 301–307

(56) References Cited

U.S. PATENT DOCUMENTS

| | | | |
|---|---|---|---|
| 4,581,644 A | * | 4/1986 | Deiss .......................... 348/705 |
| 4,590,609 A | | 5/1986 | Chevalet et al. |
| 4,827,336 A | | 5/1989 | Acampora et al. |
| 5,568,203 A | | 10/1996 | Lee |
| 5,635,705 A | | 6/1997 | Saunders |

* cited by examiner

*Primary Examiner*—Que T. Le
(74) *Attorney, Agent, or Firm*—Bernhard P. Molldrem, Jr.

(57) ABSTRACT

A bus system which includes two or more voltage-to-current transformers, a common bus, a terminal bus coupled to a voltage source, two or more first switches, and a selection circuit. Each of the voltage-to-current transformers converts a voltage signal to a current signal. The common bus carries the current signals from the voltage-to-current transformers to an output bus. Each of the first switches has a first position where an output from one of the voltage-to-current transformers is coupled to the common bus and a second position where the output is coupled to the terminal bus. The selection circuit is coupled to each of the first switches and controls movement of each of the first switches between the first and second positions.

37 Claims, 6 Drawing Sheets

CURRENT MODE ANALOG SIGNAL MULTIPLEXING BUS AND A METHOD THEREOF

This application is a continuation-in-part application of U.S. patent application Ser. No. 09/490,374 filed on Jan. 24, 2000, now U.S. Pat. No. 6,590,198, which is a continuation-in-part application of application Ser. No. 09/039,835 filed on Mar. 16, 1998, now U.S. Pat. No. 6,084,229 which is herein incorporated by reference.

FIELD OF THE INVENTION

This invention relates generally to multiplexing analog signals onto a common bus and, more particularly, to a current mode analog video bus for a device, such as an imager, and a method thereof

BACKGROUND OF THE INVENTION

Modern, solid-state, visible light imaging devices have found their way into a variety of consumer, scientific, industrial, medical and military cameras over the last thirty years or so. (These devices include the entire class of solid-state, silicon, visible light imagers including charge coupled devices (CCD's), charge injection devices (CID's) and CMOS imagers.) Over this period of time, these devices have exhibited several important trends that have only accelerated in the past decade and are discussed below.

One trend is towards increasing the size of the image array (i.e. total number of pixels per frame). This trend towards larger arrays is driven by new application requirements, the increasing prevalence of computers, and the increasing resolution of electronic displays. This trend has been enabled by advances in integrated circuit fabrication technology.

Another trend is towards increasing the number of frames per second. This trend is especially true for industrial and scientific applications where high throughput and transient event capture are key areas of concern.

Another trend is towards higher levels of integration on the image chip itself. The industry is in the early stages of having a camera on an image chip. As early as 1991, university researchers in Scotland were reporting work on a 312 by 287 pixel 'single-chip camera', as disclosed in "Video Image On a Chip", David Scott, Popular Science, September 1991, which is herein incorporated by reference. This trend toward system level integration on to a single chip is driven by cost, a desire for smaller devices, and the expanding markets for digital imagers. Again, this trend has been enabled by advances in fabrication technology, specifically the drive toward smaller minimum feature sizes.

Another trend is towards lower power. This trend is driven by the increasing demand for digital still cameras and digital video cameras which rely on batteries for power. This particular trend reflects a trend in electronics generally.

Another similar trend is towards lower voltage. As fabrication technologies tend toward smaller feature sizes, the devices can withstand lower and lower voltages. As a result, it is only a matter of time before the supply voltages drop from the now common 5 volts for 0.5 $\mu$m CMOS technology to 2.5 volts and then 1.0 volt for the next generation technologies.

Yet another trend is towards lower cost. This trend goes hand-in-hand with higher levels of integration and is a driver for decreases in process feature size.

Yet another trend is towards application ease. This trend is less obvious than the others discussed above, but is a natural extension of increasing levels of integration. As circuits become more dense and camera functions are more readily available as part of the imager, the ease of designing a camera with a modern imager becomes much easier.

One of the problems created by a combination of these trends is with analog bandwidth. More specifically, the trend toward larger arrays (i.e. more pixels per frame) and higher frame rates requires that the video output bandwidth, or pixels per second, increase proportionately. For example, a small, relatively slow imager having a resolution of 256×256 and a frame rate of 10 frames per second need only produce video at greater than 0.66 Mpixels per second. However, a modern mega-pixel imager for industrial or medical applications might have a resolution of 1,024×1,024 and a frame rate of 60 frames per second. Such a camera would need to produce video at 70–80 Mpixels per second (depending on overhead). Many existing devices cannot readily achieve these high analog video bandwidths through a single analog output port and so compromises must be made. As such, depending on the camera design constraints, the analog bandwidth limitation of the imaging device represents an upper limit on array size, frame rate or both.

Most mega-pixel image sensors, including both CCD imagers and Active Pixel Sensor (APS) type CMOS imagers, have a maximum pixel rate inadequate to meet the frame rate needs of higher end applications, such as for industrial and scientific and high definition television (HDTV) imaging applications. With respect to CCD imagers, these imagers are limited by both clocking rates and the speeds of the Correlated Double Sampling (CDS) circuitry. Additionally, the higher amplifier bandwidth required for high pixel rates for these mega pixel image sensors results in increased levels of noise. With respect to the column parallel nature of CMOS imagers, the amplifier and CDS in these imagers can be run at the line rate, rather than the pixel rate, which is generally much easier to achieve. However, the video bandwidth constraints for CMOS imagers come in terms of the multiplexing speed. CMOS imagers typically multiplex their column signals onto a common analog video bus in a sequential fashion. The more columns that are multiplexed or switched onto the bus, the greater the capacitive load that the bus presents to each column amplifier. Therefore, as more columns are connected to the bus, the bandwidth of the bus is reduced. Alternatively, greater power is needed to charge and discharge the bus with its associated capacitance to maintain bandwidth.

One example of a common video bus with a distributed capacitive load associated with each individual column switch is illustrated in FIG. 1. In order for each amplifier 100 to accurately transfer the pixel value from the array 101 represented by a voltage signal onto the common video bus 102, each amplifier 100 must charge or discharge the bus 102 within one pixel time constant. The voltage signal must be stable long enough for a sample and hold circuit (or similar) to accurately present the resultant signal to an analog to digital converter (ADC) (not shown). Typically, at least 5τ (tau or time constants) are needed to accurately allow the common video bus 102 to settle the voltage signal presented by each individual column amplifier 100.

At higher video bus speeds the individual column amplifier 100 is unable to properly charge or discharge the common video bus 102 resulting in a loss of amplitude which is perceived as a loss of contrast ratio in the video image. At higher pixel element rates where the contrast ratio is compromised, the individual column amplifier characteristic and the video switch characteristics begin to affect the resultant video. The individual column amplifiers 100 will have slightly different offsets with slightly different drive capabilities and each video switch will have slightly different resistances and slightly different thresholds. This combination of column amplifier and video switch characteristics results in each column amplifier having different time constants relative to charging and discharging the video bus. The column amplifier and video switch are common to every pixel in that column. Thus, variations in the video switch characteristics result in what appears to be column based Fixed Pattern Noise (FPN). As more columns are added, each video switch adds more associated capacitance due to the source and drain junctions of MOSFET transistors (or due to the corresponding junctions of bipolar transistors).

In order to overcome the constraints, some designers of CCD's and APS sensors have resorted to dividing up an imager 104 into halves, quarters 104(1)–104(4), or smaller groupings of sub-imagers, jammed together, as shown in FIG. 2. The signals from each of these sub-imagers 104(1)–104(4) is brought out to its own output port 106(1)–106(4). This approach has been used to provide high frame rate devices, or even to meet standard frame rates with large mega-pixel imagers. In essence, it allows each port 106(1)–106(4) to operate at its maximum pixel rate, but handle fewer pixels in the allotted frame time.

For example, a 1,024×1,024 CMOS imager can increase the number of video busses from one to four and reduce the capacitance of each bus to one-half simply by dividing the imaging array into four arrays of 512×512 each. In so doing, the overall frame rate may increase by a factor of eight. (Note that the bus capacitance for a CMOS imager scales with the change in the number of columns in a segment, not the number of pixels in the segment. Thus, a 50% capacitance reduction yields a 2× speed increase and the 75% reduction in the number of pixels per segment yields a 4× speed increase.) However, segmenting the array into subarrays adds system size, complexity, power and cost to handle the multiple analog amplifier chains, i.e. reconstruct the video image off-chip. It also adversely affects application ease for the camera designer. Clearly, this solution is in opposition to many of the trends (i.e. power, cost, application ease, etc.) cited earlier. Further, it is an extremely challenging task to ensure uniformity among each of the independent analog processing chains over all possible pixel rates and temperatures.

This issue has become even more of a problem in recent years as imagers have grown larger, now up to full wafer size. Wafer process variations across an array can lead to further balance problems and even variations in noise characteristics among the subarrays.

An attempt to gain further speed increases by increasing the drive capability of the column amplifiers necessarily increases power dissipation. This is a problem because thermal gradients across the imager may lead to (pixel) dark current shading and gradients in offset and gain among the pixels, which also shows up as a shading effect in the image.

The goal of any attempt to speed up an imager is to increase the frame rate of a given array size, maintain a frame rate while increasing the array size or both. An imager that divides the imaging array into k segments (for this particular example assume that both column and row dimensions are split more or less evenly), will have k output ports wherein the bus capacitance of each port is reduced by a factor equal to the reduction in the number of columns attached to it. For example, a 1 K×1 K array that has been divided into four sub-arrays of 512×512 each, will have four sub-busses with ½ the capacitance of a single bus for the entire array because the number of columns attached only dropped from 1 K to 512. So the analog bandwidth of each of the ports will only double not quadruple. For a CCD imager, this bandwidth may also be limited by the speed of the CDS circuitry, which typically operates at the (higher) pixel rate as opposed to the (lower) row rate. The overall frame rate of the segmented imager can be increased by a factor of k times the improvement in analog bandwidth. The time required to read out a segment is proportional to the number of pixels in the segment and for the above example this time would be reduced by a factor of four. If the bandwidth of each port doubles, then the array can be read out in one-eighth the time thereby increasing the frame rate by a factor of eight. Note that most of this improvement is due to the reduction in the number of pixels to be read out per port, not to analog bandwidth improvement. The drawback to this approach, of course, is the increase in complexity, power and size that comes from having to reassemble the image or array off-chip.

Another way to view the problems which occur when the frame rate of a given array size is increased, or the frame rate is maintained while increasing the array size, or both, is from the perspective of the terminal variables of the bus capacitance 108(1)–108(12) in FIG. 1. If the bus capacitance is modeled as a single lumped capacitor, the dynamic current i(t) that must be supplied by a given column amplifier is determined by the bus capacitance C, the voltage swing across the capacitor v(t) and the time period of interest dt, or . . .

$$i(t)=C\ dv/dt$$

Analog bus bandwidth is inversely proportional to i(t). As discussed earlier, analog bandwidth improvement with prior art devices only comes from the way in which the column dimension is divided. Thus, current improvement for the prior art will be equal to or less than the array segmentation factor k. (In the example above it was k/2.)

SUMMARY OF THE INVENTION

The present invention has recognized that by transforming the video signal from a voltage domain signal to a current domain signal it is possible to arrange the driving and load impedances such that there is no voltage swing across the bus capacitance (at least in the ideal case). With little or no voltage swing there is little or no need to charge or discharge the bus capacitance. In other words, with the present invention multiplexing of signals on the bus occurs in the current domain so that the bandwidth limiting effects of bus capacitance are minimized because the voltage swing across the bus capacitance is significantly reduced. This transformation can be readily accomplished by using a transconductance amplifier to drive the bus (current output proportional to voltage input) and a transresistance amplifier (voltage output proportional to current input) or other current-input circuit to receive the signal.

A bus system in accordance with one embodiment of the present invention includes at least one common bus for carrying one or more of a plurality of current signals, two or more first switches, and a selector. Each of the first switches has a first position where one of the current signals is coupled to the common bus and a second position where the one of the current signals is disconnected from the common bus. The selector is coupled to each of the first switches and controls movement of each of the first switches between the first and second positions. A dual or differential bus system may also be constructed such that pairs of common busses may be operated in tandem i.e. simultaneously from the same selection circuitry, to multiplex differential signals through the system to a pair of output nodes.

A method for bussing one or more of a plurality of current signals in accordance with another embodiment of the present invention is also provided. In this method, a common bus and a plurality of first switches are provided. Each of the first switches has a first position to couple one of the plurality of current signals to the common bus and a second position to disconnect the one of the plurality of current signals from the common bus. Movement of each of the first switches between the first and second positions is controlled.

An imaging system in accordance with another embodiment of the present invention includes a source of a plurality of current signals, at least one common bus for carrying one or more of the plurality of current signals, two or more first switches, and a selector. Each of the first switches has a first position where one of the current signals is coupled to the common bus and a second position where the one of the current signals is disconnected from the common bus. The selector is coupled to each of the first switches and controls movement of each of the first switches between the first and second positions.

A method for bussing one or more of a plurality of current signals in an imaging system in accordance with yet another embodiment of the present invention is also provided. In this method, a plurality of current signals, a common bus and a plurality of first switches are provided. Each of the first switches has a first position to couple one of the plurality of current signals to the common bus and a second position to disconnect the one of the plurality of current signals from the common bus. Next, movement of each of the first switches between the first and second positions is controlled.

A multiple level bus system in accordance with another embodiment of the present invention includes a plurality of first level bus systems, at least one second common bus, two or more second switches, and a second selector. Each of the first level bus systems has at least one first common bus, two or more first switches, and a first selector. The first common bus in each first level bus system carries one or more of a plurality of current signals. Each of the first switches has a first position where one of the current signals is coupled to the first level common bus and a second position where the one of the current signals is disconnected from the first level common bus. The first selector controls the movement of each of the first switches between the first and second positions. The second common bus carries one or more of the plurality of current signals from the first common busses. Each of the second switches has a first position where one of the current signals from one of the first common buses is coupled to the second common bus and a second position where the one of the current signals is disconnected from the second common bus. The second selector controls the movement of each of the second switches between the first and second positions.

A method for multiple level bussing of one or more of a plurality of current signals in accordance with another embodiment of the present invention is also provided. In this method, a plurality of first level bus systems are provided. Each of the first level bus systems comprises a first common bus and a plurality of first switches. Each of the first switches has a first position to couple one of the plurality of current signals to the common bus and a second position to disconnect the one of the plurality of current signals from the common bus. Movement of each of the first switches is controlled between the first and second positions. A second common bus and a plurality of second switches are also provided. Each of the second switches has a first position to couple one of the plurality of current signals from at least one of the first common buses to the second common bus and a second position to disconnect the one of the first common buses from the second common bus. The movement of each of the second switches is controlled between the first and second positions.

One of the advantages of the present invention is that it provides a bus which can better handle the higher analog video bandwidth requirements of imaging devices that have ever increasing image array sizes and increasing numbers of frames per second than prior buses. By way of example only, a bus in accordance with the present invention can handle the bandwidth requirements of an imager with a resolution of 1,024×1,024 and a frame rate of about 60 frames per second.

Another advantage of the present invention is that with the current bus true additive binning is possible. With the present invention, by simply setting the column selection circuitry to simultaneously steer two or more currents to the common bus the currents will be summed. This is an inherent advantage of converting the voltage image signals to current image signals because currents in parallel sum.

Yet another advantage of the present invention is that reasonable values of series resistance which may be introduced by the bus metal and bus switches do not introduce error into the current signal. Thus variations in resistance among the various signals attaching to the bus will not adversely affect output signal uniformity as they might with a voltage mode multiplexing bus when inadequate time is available to fully charge the bus capacitance. Hence, a potential source of fixed pattern noise is eliminated. Of course this holds true as long as the resistance is low enough so that the voltage compliance of the driving current amplifier is not exceeded and that the voltage swing introduced by the series resistance does not become so high that the resultant voltage signals are slowed by the bus capacitance.

Yet another advantage of the present invention is that signal dynamic range may be maintained even as supply voltages inevitably shrink. As supply voltages drop from the now common 5 volts, through the 3.3-volt level and then down through 2.5 volts and below, voltage mode operation will inevitably see a reduction in dynamic range due primarily to the reduction in full-scale voltage. Converting entire signal processing chains from voltage mode operation to current mode operation will permit maintaining dynamic range since, to a first approximation, full scale current is independent of supply voltage. The present invention represents only a portion of the signal processing chain but is essential to maintaining wide dynamic range in a full current mode design particularly where binning will be used.

Yet another advantage of the present invention is application ease and system integration in that high speed multiplexing of analog signals is accomplished with a single output port versus multiple ports thus enhancing overall system integration and eliminating the need for the user to assemble the desired array data off-chip.

Yet another advantage of the present invention is that the technology needed to realize it is compatible with typical microcircuit fabrication processes such as CMOS, BiCMOS, Bipolar, etc. and the chip area required to implement it is comparable to alternative multiplexing schemes that are limited to much lower operating speeds. Thus, the present invention offers higher performance without an area penalty. Since chip area relates proportionally to chip cost, the present invention consequently offers higher performance without a cost penalty.

DETAILED DESCRIPTION OF THE INVENTION

Figure 1:
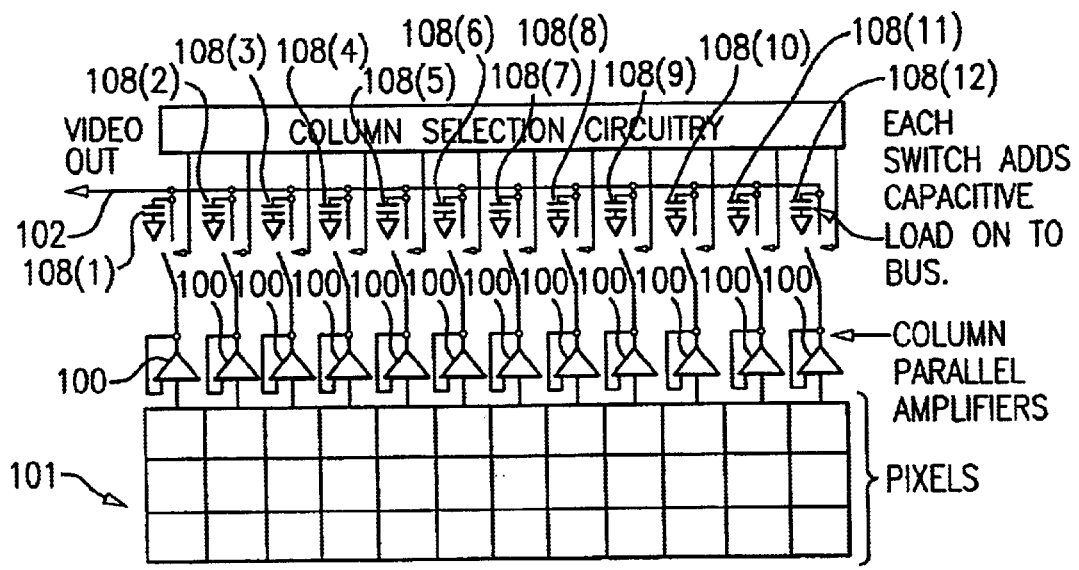
FIG. 1 is a block diagram of a prior art analog video bus.
Figure 2:
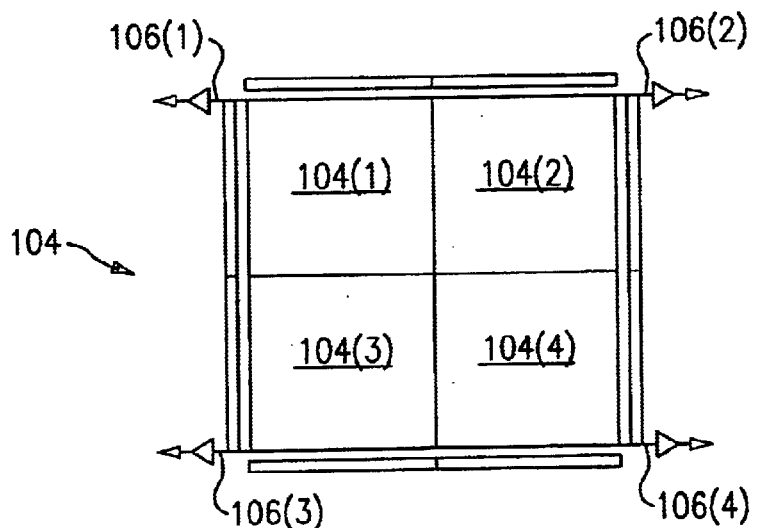
FIG. 2 is a block diagram of a prior art segmented pixel array.
Figure 3A:
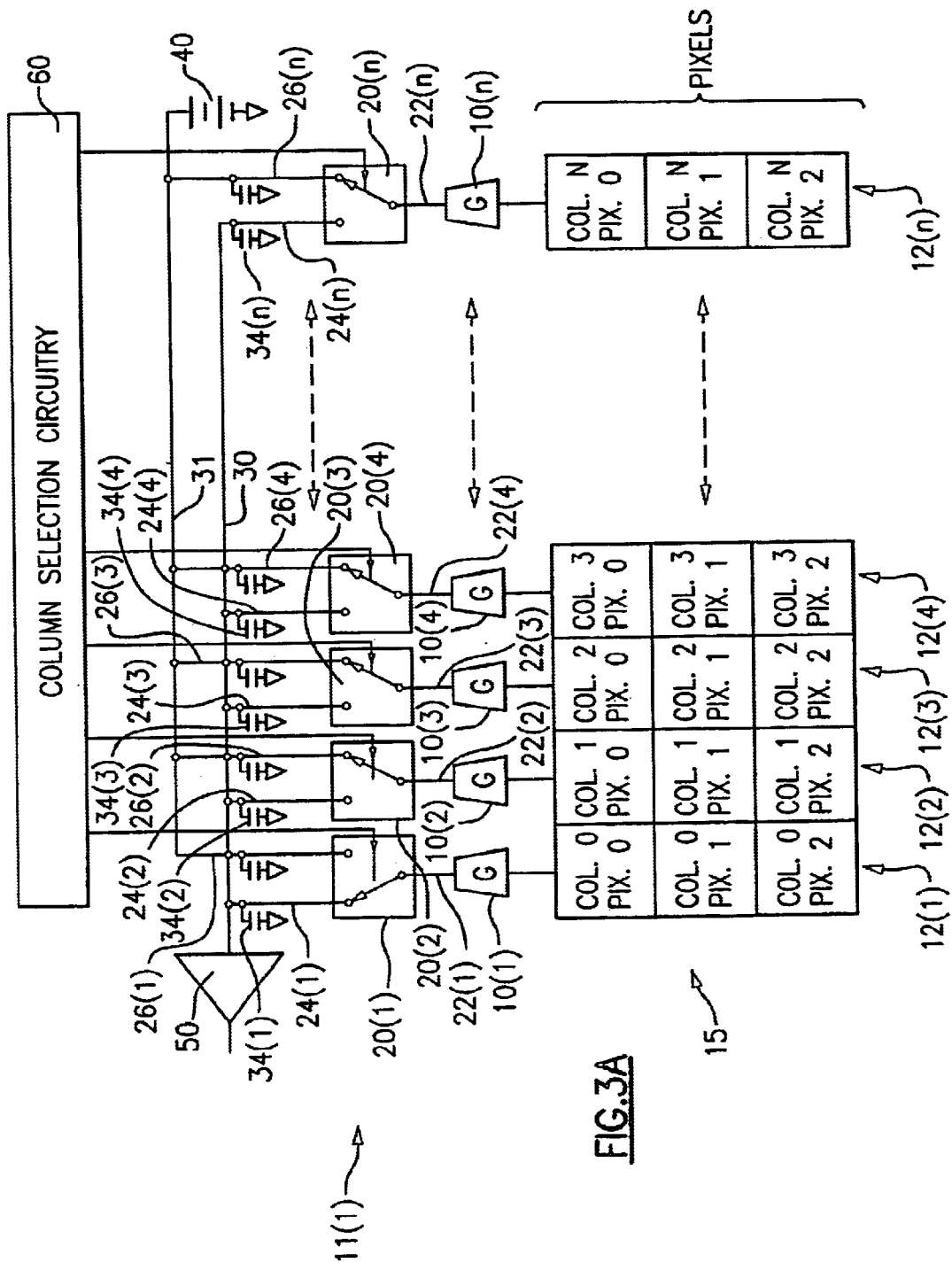
FIG. 3A is a block diagram of a video bus in accordance with one embodiment of the present invention.

A bus system 11(1) in accordance with one embodiment of the present invention is illustrated in FIG. 3A. The bus system 11(1) includes two or more voltage-to-current transformers 10, a common bus 30, a terminal or dummy bus 31 coupled to a voltage source 40, two or more first switches 20(1)–20(n), and a selection circuit 60. Basically, the bus system 11(1) is a high-speed analog multiplexer where signals are multiplexed onto a common bus 30 in the current domain. The bus system and method provide a number of advantages including minimizing the bandwidth limiting effects of bus capacitance by significantly reducing the voltage swing across the bus capacitance and providing a bus system 11(1) which can better handle the higher analog video bandwidth requirements of imaging devices that have ever increasing image array sizes and increasing numbers of frames per second.

Referring to FIG. 3A, in this particular embodiment the source 15 of voltage signals to the bus system 11(1) is an imaging system with an array of pixels controlled by an active column sensor, such as the one disclosed in U.S. Pat. No. 6,084,229 for A Complementary Metal Oxide Semiconductor Imaging Device which is herein incorporated by reference, although other sources of signals, such as APS or CID image arrays, magnetic or piezoelectric transducers for audio and/or ultrasound, infrared image arrays and X-ray image arrays can also be used. Additionally in this particular embodiment, the signals are provided in column format 12(1)–12(n) and are voltage-domain signals, although the signals could be provided in other formats, such as in a row format, and in other domains (as long as some means is provided to convert to the current domain).

The signals from each of the columns 12(1)–12(n) of source 15 are provided to a plurality of voltage-to-current converters 10(1)–10(n). In this particular embodiment, each of the voltage-to-current converters 10(1)–10(n) is a transconductance amplifier, although other types of converters could be used. A transconductance amplifier is a linear amplifier with very high input and output impedance and an output current signal that is a linearly scaled representation of the input voltage signal. The scale factor is a transconductance or reciprocal resistance (1/Ω) measured in mho's. (One 'mho' is defined as 1 ampere divided by 1 volt.) A transconductance amplifier that produces a 200 μA full-scale current output signal in response to a 2 volt input swing would have a transconductance of 100 μmhos. A transconductance amplifier permits the current signal at its output to change in response to the voltage signal at its input regardless of the load impedance as long as the load impedance does not cause the output voltage to exceed the transconductance amplifiers allowable range i.e. it's voltage compliance. In this application, it is desired to drive into a very low impedance on the common bus 30 so that the voltage swing is minimized. Each current signal driver, which in this particular embodiment is the voltage-to-current converter 10, has a high (ideally infinite) output impedance and the common current signal receiver, which in this particular embodiment is the transresistance amplifier 50, attached to the common bus 30, has a low (ideally zero) input impedance.

In this particular embodiment, switches 20(1)–20(n) each have an input terminal 22 and a pair of output terminals 24 and 26. The input terminal 22 of each switch 20 is coupled to the output of one of the voltage-to-current converters 10 and the output terminals 24 and 26 of each switch 20 are coupled to the common bus 30 and a terminal bus 31, respectively. In this particular embodiment, each of the switches 20 has a single pole double throw (SPDT) behavior. As a result, a current signal from voltage-to-current converter 10 couples through to either the common bus 30 or terminal bus 31 depending upon the position of the switch 20. The flow of current is never intended to be interrupted by the switches 20, but instead is intended to be steered from the voltage-to-current converters 10(1)–10(n) to either common bus 30 or terminal bus 31. Allowing the current to be steered rather than interrupted is necessary to ensure operation at a constant voltage on the common bus 30. Were the flow of current from the voltage-to-current converters allowed to be interrupted, the voltage at the output of the converter would swing to one or the other supply rail necessitating a complementary voltage swing across the bus capacitance upon reconnection of the converter 10 to the bus 30. Voltage swing across the bus capacitance is the primary bandwidth limitation and is thus to be avoided. This is also the reason why the terminal bus 31 is maintained at the same voltage as the common bus 30. The capacitance introduced by each connection to common bus 30 via output terminal 24 is represented by capacitors 34(1)–34(n).

A selection circuit 60 is coupled to each of the switches 20(1)–20(n). Selection circuit 60 transmits control signals which control the position of each switch 20, i.e. whether each switch couples the current signal from the voltage-to-current converter 10 to the common bus 30 or to the terminal bus 31. The number of switches 20 coupling current signals from the voltage-to-current converters 10 to the common bus 30 or to the terminal bus 31 at one time can vary as needed or desired. With the present invention, true additive binning is possible. Multiple current signals can be readily summed if the selection circuit 60 sets multiple switches 20 to simultaneously steer their current signals on to the common bus 30 at the same time. This is one of the inherent advantages of operating in a current mode because unlike voltage signals, current signals in parallel sum.

As discussed above, in this particular embodiment bus system 11(1) includes the common bus 30 and the terminal bus 31, although the bus system 11(1) could have more busses as needed or desired. To minimize any voltage swing at the output of the voltage-to-current converters 10(1)–10(n), the current signals steered to busses 30, 31 by switches 20(1)–20(n) should be held at substantially the same potential. In this particular embodiment, a voltage source 40 is connected to the terminal bus 31 to provide a bias potential intended to substantially duplicate the voltage of common bus 30 on terminal bus 31. The nominal voltage or potential on the common bus 30 is determined by the bus receiver 50 which is coupled to the common bus 30.

The bus receiver 50 outputs the current signals loaded on to the common bus 30 from voltage-to-current converters 10. By way of example only, the bus receiver 50 may be a transresistance amplifier if a voltage output is desired or a current amplifier/buffer for isolation if a current output is desired. A transresistance amplifier is the inverse of a transconductance amplifier in that the input variable is a current signal and the output variable is a voltage signal. The transresistance amplifier's scale factor is a resistance. Whichever is desired for a specific application, the input impedance of the bus receiver 50 multiplied by the full-scale signal current determines the peak voltage swing across the bus. The input impedance of the bus receiver 50 should be as low as possible to ensure minimal voltage swing across the bus capacitance.

Figure 3B:
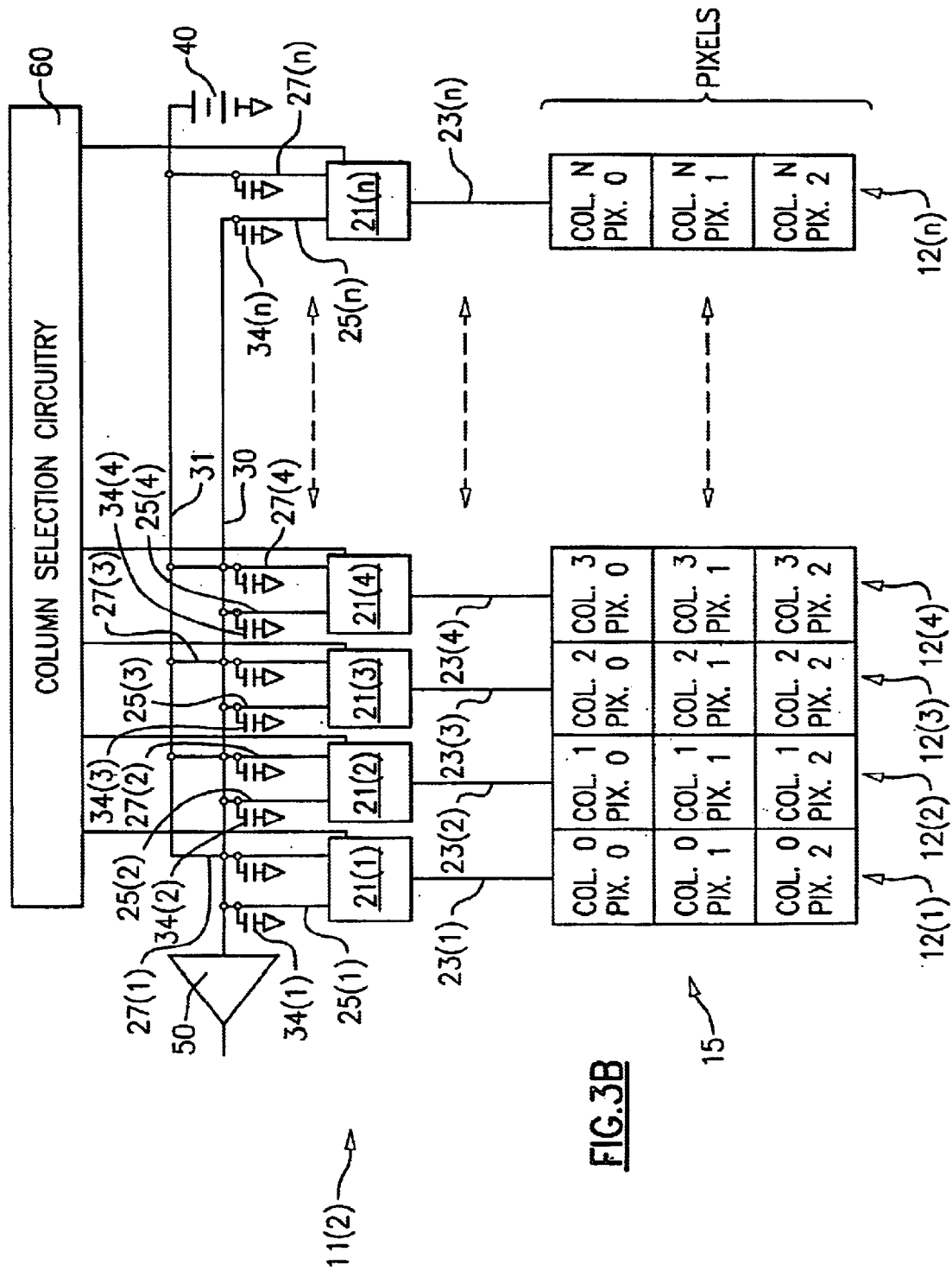
FIG. 3B is a block diagram of a video bus in accordance with another embodiment of the present invention.

Referring to FIG. 3B, an alternative embodiment for the bus system 11(2) is illustrated. Corresponding elements in FIG. 3B have numeral designations which correspond to those numeral designations used in FIG. 3A and thus will not be described here again.

The signals from each of the columns 12(1)–12(n) of source 15 are provided to a plurality of input terminals 23(1)–23(n) to switchable transconductors 21(1)–21(n) and the output terminals 25(1)–25(n) and 27(1)–27(n) of each of the switchable transconductors 21(1)–21(n) are coupled to the common bus 30 and a terminal bus 31, respectively. Each of the switchable transconductors 21(1)–21(n) permits a current signal at its output to change in response to the voltage signal at its input regardless of the load impedance as long as the load impedance does not cause the output voltage to exceed the switchable transconductors' 21(1)–21(n) allowable range i.e. their voltage compliance. In this application, it is desired to drive into a very low impedance on the common bus 30 so that the voltage swing is minimized. Each current signal driver, which in this particular embodiment is one of the switchable transconductors 21(1)–21(n), has a high (ideally infinite) output impedance and the common current signal receiver, which in this particular embodiment is the transresistance amplifier 50, attached to the common bus 30, has a low (ideally zero) input impedance. Each of the switchable transconductors 21(1)–21(n) also couples the converted voltage signal or current signal through to either the common bus 30 or terminal bus 31 depending upon the position of the switchable transconductors 21(1)–21(n). The flow of current is never intended to be interrupted by the switchable transconductors 21(1)–21(n), but instead is intended to be steered to either common bus 30 or terminal bus 31. Allowing the current to be steered rather than interrupted is necessary to ensure operation at a constant voltage on the common bus 30. Were the flow of current from the voltage-to-current converters allowed to be interrupted, the voltage at the output of the converter would swing to one or the other supply rail necessitating a complementary voltage swing across the bus capacitance upon reconnection of the converter 10 to the bus 30. Voltage swing across the bus capacitance is the primary bandwidth limitation and is thus to be avoided. This is also the reason why the terminal bus 31 is maintained at the same voltage as the common bus 30. The capacitance introduced by each connection to common bus 30 via output terminal 24 is represented by capacitors 34(1)–34(n).

A selection circuit 60 is coupled to each of the switchable transconductors 21(1)–21(n). Selection circuit 60 transmits control signals which control the position of each switchable transconductors 21(1)–21(n), i.e. whether each switchable transconductors 21(1)–21(n) couples the current signal to the common bus 30 or to the terminal bus 31. The number of switchable transconductors 21(1)–21(n) coupling current signals to the common bus 30 or to the terminal bus 31 at one time can vary as needed or desired. With the present invention, true additive binning is possible. Multiple current signals can be readily summed if the selection circuit 60 sets multiple switchable transconductors 21(1)–21(n) to simultaneously steer their current signals on to the common bus 30 at the same time. This is one of the inherent advantages of operating in a current mode because unlike voltage signals, current signals in parallel sum.

As discussed above, in this particular embodiment bus system 11(1) includes the common bus 30 and the terminal bus 31, although the bus system 11(1) could have more busses as needed or desired. To minimize any voltage swing at the output of the voltage-to-current converters 10(1)–10 (n), the current signals steered to busses 30, 31 by switchable transconductors 21(1)–21(n) should be held at substantially the same potential. In this particular embodiment, a voltage source 40 is connected to the terminal bus 31 to provide a bias potential intended to substantially duplicate the voltage of common bus 30 on terminal bus 31. The nominal voltage or potential on the common bus 30 is determined by the bus receiver 50 which is coupled to the common bus 30.

Figure 4:
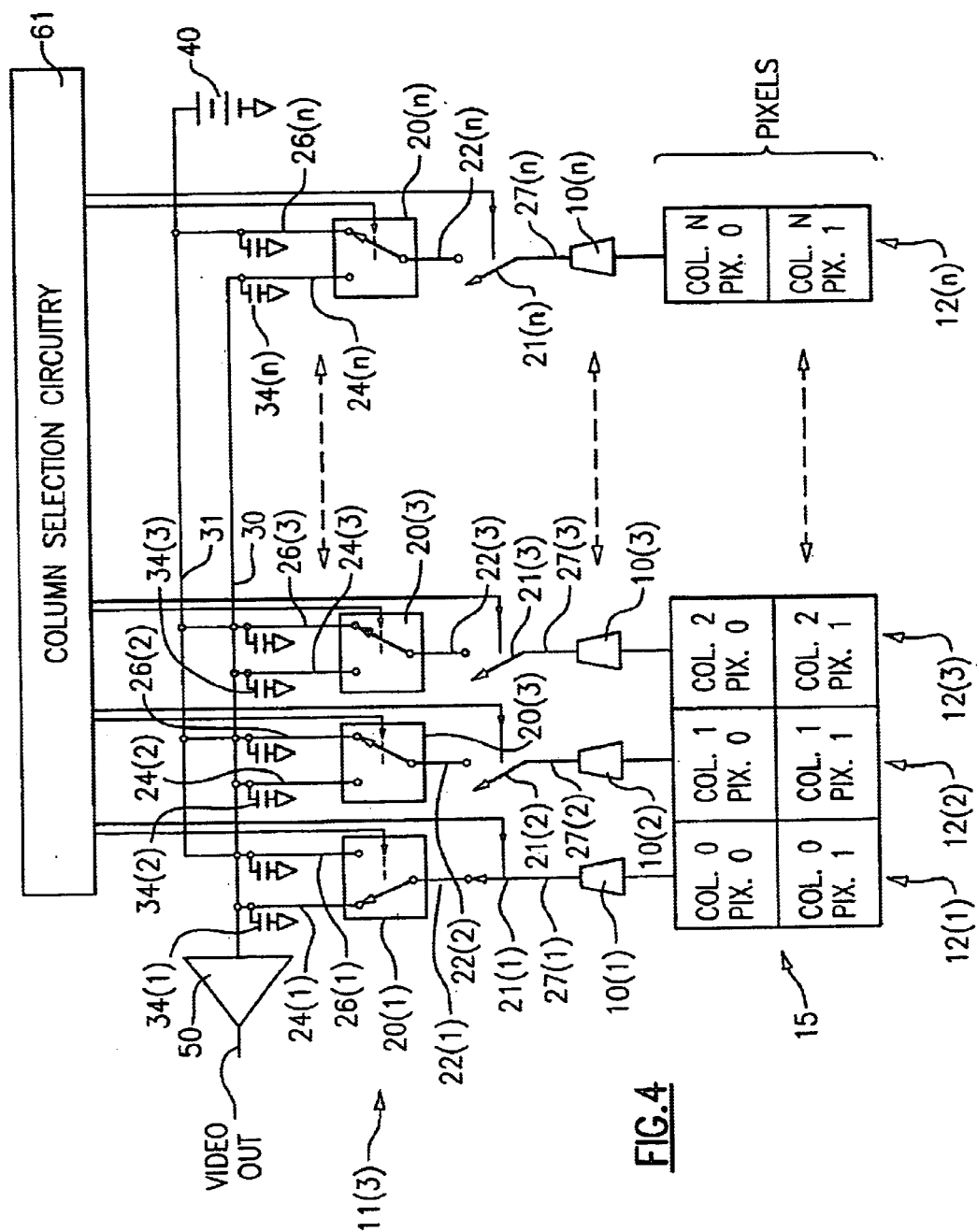
FIG. 4 is a block diagram of a video bus modified for low dissipation in accordance with yet another embodiment of the present invention.

Referring to FIG. 4, an alternative embodiment for the bus system 11(3) is illustrated. Corresponding elements in FIG. 4 have numeral designations which correspond to those numeral designations used in FIG. 3A and thus will not be described here again. In this particular embodiment, switches 21(1)–21(n) each have an open position and a closed position with an input terminal 27(1)–27(n), respectively, coupled to an output of one of the voltage-to-current converters 10 and an output terminal 29 coupled to the input terminal 22 of one of the switches 20.

A selection circuit 61 is coupled to the switches 20(1)–20(n) and to switches 21(1)–21(n). Like selection circuit 60, selection circuit 61 transmits control signals which control the position of each switch 20, i.e. whether each switch 20 couples the current signal from the voltage-to-current converter 10 to the common bus 30 or to the terminal bus 31. The number of switches 20 coupling current signals from the voltage-to-current converters 10 to the common bus 30 or to the terminal bus 31 at one time can vary as needed or desired. Selection circuit 61 also transmits control signals which control the position of each switch 21, i.e. whether each switch couples the current signal from the voltage-to-current converter 10 to the input terminal 22 of switch 20. The number of switches 21 coupling current signals from the voltage-to-current converters 10 to the switches 20 at one time can vary as needed or desired. Although in this particular embodiment, a single selection circuit 61 controls both the switches 20 and the switches 21, more than one selection circuit can be used to control switches 20 and/or switches 21 if needed or desired.

When large busses i.e. busses with many switches attached, are being considered, attention must be paid to the power dissipation represented by each of the voltage-to-current converters 10, in this particular embodiment column amplifiers, idling with potentially full-scale current. Unlike the voltage domain where unselected amplifiers supply no current to the bus, an unselected voltage-to-current converter 10 always supplies current, but it is steered away from the common bus 30 to the terminal bus 31 until it is selected. So most of the time the voltage-to-current converters 10 are dissipating power for no useful purpose. Unfortunately, interrupting the current of unselected voltage-to-current converters 10 would cause their outputs to saturate toward a supply rail or ground (depending on the design). Once selected these voltage-to-current converters 10 would require a certain amount of time to settle out, but worst of all there would be a voltage swing across the bus capacitance which would defeat the purpose of the current bus in the first place. Thus, in order to keep the average power dissipation low and yet ensure the desired behavior, switches 21(1)–21(n) are added in this particular embodiment.

Figure 3C:
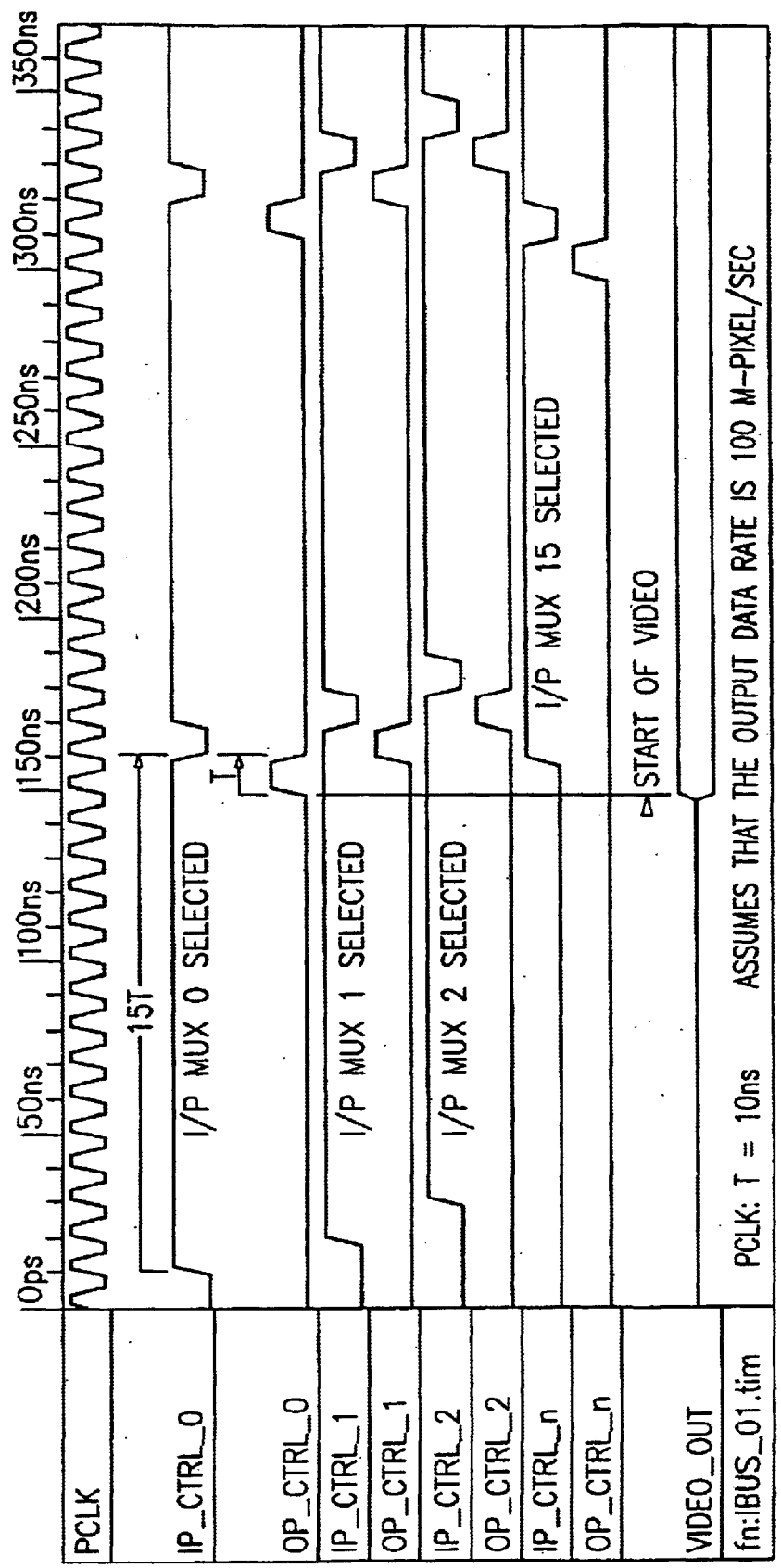
FIG. 3C is a timing diagram of control signals for the video bus in FIG. 3A.

Referring to FIGS. 3A and 3C, the operation of the bus system 11(1) is described below. In this particular embodiment, voltage signals from each of the columns 12(1)–12(n) of source 15 are provided to the plurality of voltage-to-current converters 10(1)–10(n), which in this particular embodiment are transresistance amplifiers. Each of the converters 10(1)–10(n) converts the voltage signal to a corresponding current signal. The current signals from the outputs of converters 10(1)–10(n) are supplied to the input terminals 22 of switches 20(1)–20(n).

Selection circuit 60 controls the position of each of the switches 20(1)–20(n). The selection circuit 60 switches one or more of the switches 20(1)–20(n) to a first position and the remaining switches 20 to the second position. In the first position, the current signal or signals are coupled through the switch or switches 20 to the common bus 30 and in the second position the current signal or signals are coupled through the switch or switches 20 to the terminal bus 31. The selection circuit 60 in a systematic manner moves the first switches 20(1)–20(n) between the first and second positions to transfer the current signals on to the common bus 30 and out through the bus receiver 50.

More specifically, in this particular embodiment selection circuit 60 has a clock PCLK which is used to control the timing of the control signals from selection circuit 60 to the switches 20(1)–20(n). In this particular example, when IP_CTRL_0 is high and OP_CTRL_0 is high, then selection circuit 60 signals switch 20(1) to couple the current signal on input terminal 22(1) from voltage-to-current converter 10(1) to common bus 30 via output terminal 24(1). When IP_CTRL_1 is high and OP_CTRL_1 is high, then selection circuit 60 signals switch 20(2) to couple the current signal on input terminal 22(2) from voltage-to-current converter 10(2) to common bus 30 via output terminal 24(2). When IP_CTRL_2 is high and OP_CTRL_2 is high, then selection circuit 60 signals switch 20(3) to couple the current signal on input terminal 22(3) from voltage-to-current converter 10(3) to common bus 30 via output terminal 24(1). When IP_CTRL_n is high and OP_CTRL_n is high, then selection circuit 60 signals switch 20(n) to couple the current signal on input terminal 22(n) from voltage-to-current converter 10(n) to common bus 30 via output terminal 24(1). When Video_Out is high, then the signal or signals on common bus 30 are output. Although one example is described herein, a variety of different types of timing diagrams could be used by selection circuit 60 to control the timing of switching the current signals on to the common bus 30.

One of the advantages of the present invention is that by operating in the current mode, true additive binning of the signals is possible. Multiple current signals can be readily summed if the selection circuit 60 sets multiple switches 20 to the first position to simultaneously steer their current signals on to the common bus 30 at the same time because current signals in parallel sum. When used in an imaging system, true additive summation permits multi-resolution image capture, spatial filtering and image interpolation.

Meanwhile, the remaining current signals are coupled to the terminal bus 31 until the selection circuit 60 switches them to the first position coupled to the common bus 30. As discussed earlier, the voltage source 40 coupled to the terminal bus 31 is set to provide a bias potential or voltage on terminal bus 31 which substantially duplicates the potential or voltage on common bus 30. This helps to reduce the voltage swing across the bus capacitance for common bus 30 which helps to minimize the bandwidth limiting effects of bus capacitance for bus system 11(1). As a result, the bus system 11(1) can handle higher analog video bandwidth requirements of imaging devices with ever increasing image array sizes and increasing numbers of frames per second than prior buses.

The extent to which the bus system 11(1) can improve analog bandwidth is determined primarily by the load impedance, i.e. the input impedance of bus receiver 50. It is not unusual for simple integrated transresistance amplifiers or current mirrors to achieve input impedances on the order of 500 Ω to 1 kΩ. Thus, depending on the full-scale current used to drive the common bus 30, a 100:1 voltage swing reduction can be readily achieved. For example, a 2-volt swing could be converted to a 20 µA full scale current and be received by a current mirror with an input impedance of 1 kΩ resulting in a voltage swing of just 20 mV. That represents a 100-fold reduction in voltage across the bus capacitance and consequently a proportional increase in bandwidth. Problems can arise for this technique when series inductance and resistance become appreciable, however, considering that the applications contemplated involve short distances on integrated circuits, the stray inductances can be assumed to be very small and therefore insignificant. Designing wide bus runs can minimize series resistance and inductance. Bus resistances of a few ohms are not likely to be problematic unless the bus capacitance is exceedingly high and the desired bandwidth is also very high.

Referring to FIG. 3B, the operation of the bus system 11(2) will be described. Since the operation of bus system 11(2) is the same as bus system 11(1), only the differences in their operation will described below.

In this particular embodiment, voltage signals from each of the columns 12(1)–12(n) of source 15 are provided to the plurality of switchable transconductors 21(1)–21(n). Each of the switchable transconductors 21(1)–21(n) converts the voltage signal to a corresponding current signal.

Meanwhile, selection circuit 60 controls the position of each of the switchable transconductors 21(1)–21(n). The selection circuit 60 switches one or more of the switchable transconductors 21(1)–21(n) to a first position and the remaining switchable transconductors 21(1)–21(n) to the second position. In the first position, the current signal or signals are coupled through the switchable transconductors 21(1)–21(n) to the common bus 30 and in the second position the current signal or signals are coupled through the switchable transconductors 21(1)–21(n) to the terminal bus 31. The selection circuit 60 in a systematic manner moves the switchable transconductors 21(1)–21(n) between the first and second positions to transfer the current signals on to the common bus 30 and out through the bus receiver 50. A variety of different types of timing diagrams could be used by selection circuit 60 to control the timing of switching the current signals on to the common bus 30, such as the one described earlier and illustrated in FIG. 3C.

One of the advantages of the present invention is that by operating in the current mode, true additive binning of the signals is possible. Multiple current signals can be readily summed if the selection circuit 60 sets multiple switchable transconductors 21(1)–21(n) to the first position to simultaneously steer their current signals on to the common bus 30 at the same time because current signals in parallel sum. When used in an imaging system, true additive summation permits multi-resolution image capture, spatial filtering and image interpolation.

Meanwhile, the remaining current signals are coupled to the terminal bus 31 until the selection circuit 60 switches them to the first position coupled to the common bus 30. As discussed earlier, the voltage source 40 coupled to the terminal bus 31 is set to provide a bias potential or voltage on terminal bus 31 which substantially duplicates the potential or voltage on common bus 30. This helps to reduce the voltage swing across the bus capacitance for common bus 30 which helps to minimize the bandwidth limiting effects of bus capacitance for bus system 11(2). As a result, the bus system 11(2) can handle higher analog video bandwidth requirements of imaging devices with ever increasing image array sizes and increasing numbers of frames per second than prior buses.

Referring to FIG. 4, the operation of the bus system 11(3) will be described. Since the operation of bus system 11(3) is the same as bus system 11(1), only the differences in their operation will described below. In this particular embodiment, the selection circuit 61 keeps switches 21 open for all channels of current signals from voltage-to-current converters 10, except the channel currently being connected or 'steered' to the common bus 30 by a switch 20, as well as the next 'n' channels of current signals from voltage-to-current converters 10 to be connected to the common bus 30. This preselection of channels of current signals from voltage-to-current converters 10 allows time for the channels to settle out to their steady state values. The number of channels that are 'preselected' is determined by the time necessary for a voltage-to-current converter 10, in this particular embodiment a transconductance amplifier, to settle out and the desired bandwidth of the common bus 30. In this way, each channel 12 could be given sufficient time to settle out to its proper voltage before being selected and steered to the common bus 30. In this particular example, all channels 12 from voltage-to-current converters 10 that have their switch 21 closed, but are not selected for connection to the common bus 30 would be steered by switch 20 to the terminal bus 31, as described earlier. This alternative embodiment of the invention allows higher currents to be supplied by each channel 21 while keeping the average power dissipation of the bus system 11(3) low. A variation of this alternative embodiment which also seeks to allow higher currents to be supplied by each channel 21 while keeping the average power dissipation of the bus system 11(3) low is described next. This variation replaces switches 21(n) and converters 10(n) by switchable converters. Each switchable converter would behave the same way as the unswitched converter 10 when switched on; however, when it is switched off its power dissipation would drop to very low levels (essentially zero) and its output current would go to zero. Consequently, there would be no need to open the path between the converter and the bus as is done with switch 21. Thus, the system's functional behavior is the same as the alternative embodiment described above.

The embodiments discussed above are examples of single level multiplexing bus systems, i.e. bus systems wherein N sources are multiplexed to a single node, alternatively described as N:1 multiplexers. As discussed below, the present invention may also be used as a multiple-level multiplexing bus system. For example, a two level multiplexing bus system shown in FIG. 5 has a first level comprising multiple N:M multiplexers (M≠1, M<N) collectively referred to as an "input multiplexer" followed by a second level comprising an M:1 multiplexer referred to as an "output multiplexer."

Figure 5:
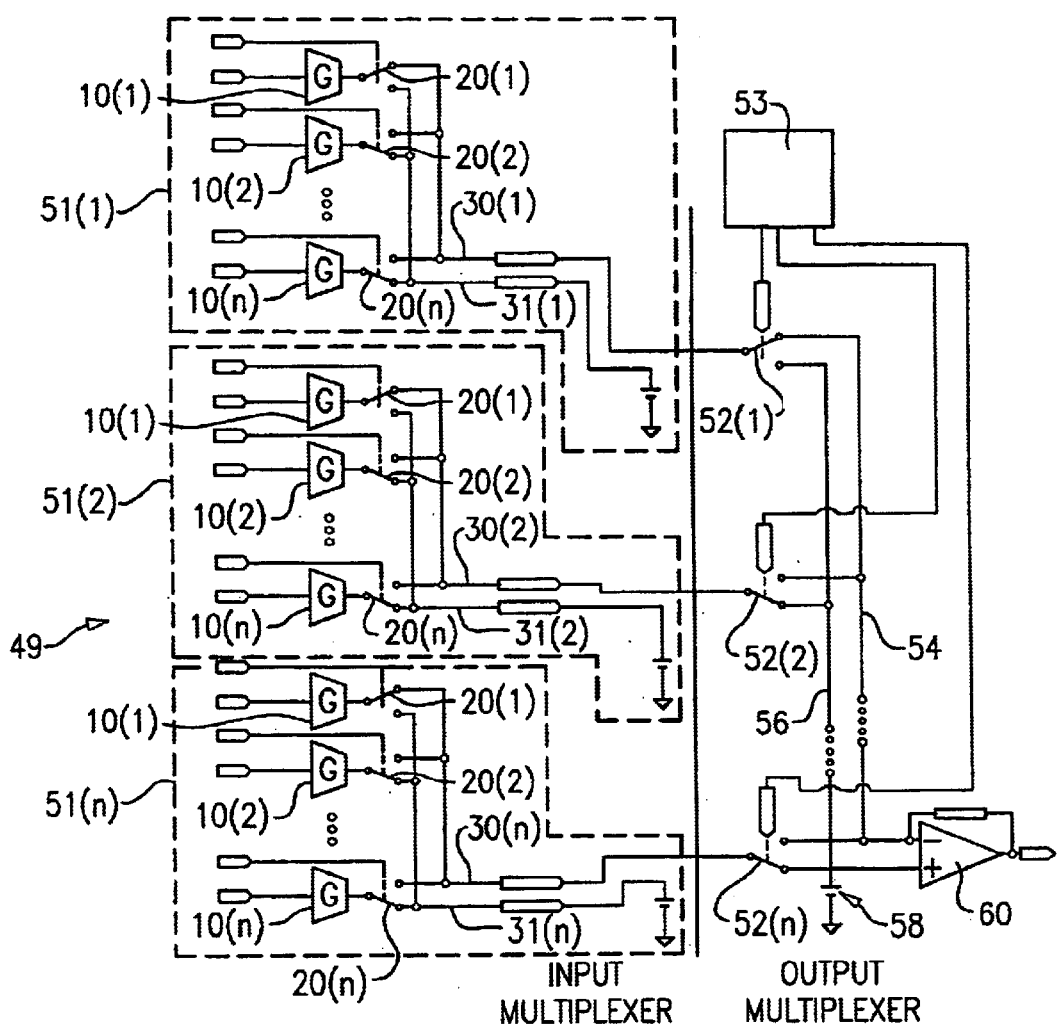
FIG. 5 is a block diagram of a video bus with a two-level multiplexer in accordance with another embodiment of the present invention.

Referring more specifically to FIG. 5, one example of such a two level bus system 49 in accordance with another embodiment of the present invention is illustrated. In this particular embodiment, the two level bus system includes a plurality of bus systems 51(1)–51(n), a set of output switches 52(1)–52(n), a selection circuit 53, another common bus 54, another terminal bus 56, another voltage source 58, and another output amplifier 60.

Except as set forth herein, the components and operation of each of the plurality of single level bus systems 51(1)–51(n) are the same as the single level bus system 11 described earlier, such as bus system 11(1), 11(2), or 11(3) and thus will not be discussed in detail here. For ease of illustration, since the components and their connections in bus systems 51(1)–51(n) have already been shown and described earlier with the description of bus system 11, all of the components are not shown in FIG. 5.

Unlike bus system 11, in each of the bus systems 51(1)–51(n) the common buses 30(1)–30(n) are coupled to one of the output switches 52(1)–52(n), not to a bus receiver 50. More specifically, in this particular embodiment switches 52(1)–52(n) each have an input terminal and a pair of output terminals. The input terminal of each switch 52 is coupled to one of the common buses 30(1)–30(n) from bus systems 51(1)–51(n) and the output terminals of each switch 52 are coupled to the common bus 54 and the terminal bus 56, respectively. The selection circuit 53 transmits control signals which controls the position of each of the switches 52(1)–52(n) to couple the current signal on the common buses 30(1)–30(n) to either the common bus 54 or to the terminal bus 56. The number of switches 52 coupling current signals from the common buses 30(1)–30(n) to the common bus 54 or to the terminal bus 56 at one time can vary as needed or desired. Although a separate selection circuit 53 is shown in this particular embodiment, other types of selection circuits and other configurations for controlling the switches 20(1)–20(n), 21(1)–21(n), and 51(1)–51(n) can be used, such as one selection or control circuit for all of the switches.

In this particular embodiment a voltage source 58 is connected to the terminal bus 56 to provide a bias potential intended to substantially duplicate the voltage of common bus 54 on terminal bus 56. The nominal voltage or potential on the common bus 54 is determined by the bus receiver 60 which is coupled to the common bus 54.

The bus receiver 60 outputs the current signals loaded on to the common bus 54 from common buses 30(1)–30(n). In this particular embodiment, the bus receiver 60 is an operational amplifier with a negative input terminal for the operational amplifier coupled to the common bus 54 and the positive input terminal of the operational amplifier coupled to the terminal bus 56, although other components and/or circuits could be used for bus receiver 60. Although in this particular embodiment, two levels of multiplexing are shown, the bus system 49 could have multiple levels of multiplexing as required by the particular application.

Figure 6:
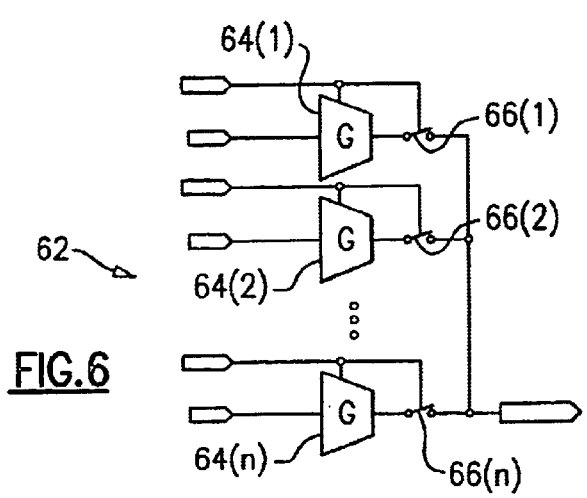
FIG. 6 is a block diagram of a video bus with a two-level multiplexer that utilizes a switchable transconductor and a SPST switch that is closed only while the transconductor is turned on in accordance with another embodiment of the present invention.

Although one example of a bus system 51 is shown in FIG. 5, other types of bus systems can also be used. For example, referring to FIG. 6 a single level bus system 62 in accordance with another embodiment of the present invention is illustrated. Except as described herein, the components and operation of the single level bus system 62 are the same as the bus system 51. For ease of illustration, since the components and their connections in bus system 62 have already been shown and described earlier with the description of bus system 51 they are not all shown in FIG. 6. In this particular embodiment, the single level bus system 62 utilizes transconductors 64(1)–64(n) and SPST switches 66(1)–66(n). Each of the SPST switches 66(1)–66(n) is closed only while the particular transconductors 64(1)–64(n) coupled to the particular switch 66(1)–66(n) is turned on. Since the transconductors 64(1)–64(n) in this particular embodiment do not consume any current when not selected, the single level bus system 62 is able to eliminate the current steering switches 20(1)–20(n) and the terminal buses 31(1)–31(n) coupled to an associated voltage source 40(1)–40(n).

Referring back to FIG. 5, the operation of the bus system 49 is described below. In this particular embodiment, switches 20(1)–20(n) in each of the bus systems 51(1)–51(n) are moved between the first and second positions to transfer the current signals on to the common buses 30(1)–30(n) or to terminal buses 31(1)–31(n) until transferred to the common buses 30(1)–30(n). As discussed earlier, the voltage sources 40(1)–40(n) coupled to their corresponding terminal buses 31(1)–31(n) in bus systems 51(1)–51(n) are each set to provide a bias potential or voltage on their corresponding terminal buses 31(1)–31(n) which substantially duplicates the potential or voltage on the corresponding common buses 30(1)–30(n). This helps to reduce the voltage swing across the bus capacitance for each of the common buses 30(1)–30(n) which helps to minimize the bandwidth limiting effects of bus capacitance for each of the bus systems 51(1)–51(n). As a result, the bus systems 51(1)–51(n) can handle higher analog video bandwidth requirements of imaging devices with ever increasing image array sizes and increasing numbers of frames per second than prior buses.

Next in this particular embodiment, switches 52(1)–52(n) are moved between the first and second positions to transfer the current signals on to the common bus 54 or to terminal bus 56 until transferred to the common bus 54 and out through bus receiver 60. Similarly, the voltage source 58 coupled to the terminal bus 56 is set to provide a bias potential or voltage on the terminal bus 56 which substantially duplicates the potential or voltage on the common bus 54.

With a multiple-level multiplexing bus in accordance with the present invention, potential speed and power benefits are provided. Specifically, each of the M instances of the N:M (input) multiplexers has a longer period of time to settle out to its final value before selection by the output multiplexer. This time may be needed for very large busses where the buss capacitance is very high i.e. many thousands of signals need to be multiplexed, or for low power applications where all transconductors are turned off, except those that are selected for output. In this case, the time would be needed to turn on the respective transconductors and have them settle to their final values prior to selection by the output multiplexer to couple them to the common bus 54.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A bus system comprising:

at least one common bus for carrying one or more of a plurality of current signals;

two or more first switches, each of the first switches having a first position where one of the current signals is coupled to the common bus and a second position where the one of the current signals is disconnected from the common bus;

a selector coupled to each of the first switches, the selector controlling movement of each of the first switches between the first and second positions;

two or more voltage-to-current transformers, each of the voltage-to-current transformers converting a respective one of a plurality of voltage signals to one of the plurality of current signals and each of the first switches coupled between one of the voltage-to-current transformers and the common bus; and further comprising two or more second switches, each of the second switches being coupled between one of the voltage-to-current transformers and one of the first switches, each of the second switches having an open position disconnecting one of the voltage-to-current transformers from one of the first switches and a closed position connecting one of the voltage-to-current transformers to one of the first switches.

2. The bus system as set forth in claim 1 wherein the selector is coupled to each of the second switches, the selector controlling movement of each of the second switches between the open and closed positions.

3. The bus system as set forth in claim 2 wherein the selector controls the second switches so that only one of the second switches is in the closed position at a time.

4. The bus system as set forth in claim 2 wherein the selector controls the second switches so that at least two of the second switches are in the closed position at substantially the same time.

5. A method for bussing one or more of a plurality of current signals, the method comprising:

providing a common bus and a plurality of first switches, each of the first switches having a first position to couple one of the plurality of current signals to the common bus and a second position to disconnect the one of the plurality of current signals from the common bus;

controlling movement of each of the first switches between the first and second positions, converting a plurality of input voltage signals respectively to the plurality of current signals;

wherein each of the first switches in the second position is coupled to a terminal bus.

6. An imaging system comprising:

a source of a plurality of current signals, wherein the source of the plurality of current signals comprises an array of pixels, said source comprising two or more voltage-to-current transformers;

at least one common bus for carrying one or more of the plurality of current signals;

two or more first switches, each of the first switches having a first position where one of the current signals is coupled to the common bus and a second position where the one of the current signals is disconnected form the common bus; and a selector coupled to each of the first switches, the selector controlling movement of each of the first switches between the first and second positions; each of the first switches being coupled between one of the voltage-to-current transformers and the common bus, wherein each of the voltage-to-current transformers converts a voltage signal from the array of pixels to one of the plurality of current signals;

a terminal bus, wherein each of the first switches in the second position couples the voltage-to-current transformers coupled to that first switch to the terminal bus, wherein the terminal bus is coupled to a voltage source; and further comprising two or more second switches, each of the second switches being coupled between one of the voltage-to-current transformers and one of the first switches, each of the second switches having an open position disconnecting one of the voltage-to-current transformers from one of the first switches and a closed position connecting one of the voltage to current transformers to one of the first switches.

7. The imaging system as set forth in claim 6 wherein the selector controls the first switches so that only one of the first switches is in the first position at a time.

8. The imaging system as set forth in claim 6 wherein the selector controls the first switches so that two or more of the first switches are in the first position at substantially the same time.

9. The imaging system set forth in claim 6 wherein each of the first switches is a switchable transconductor that converts a voltage signal to one of the plurality of current signals and that has the first position where one of the current signals is coupled to the common bus and the second position where the one of the current signals is disconnected from the common bus.

10. The imaging system as set forth in claim 6 wherein the selector is coupled to each of the second switches, the selector controlling movement of each of the second switches between the open and closed positions.

11. The imaging system as set forth in claim 10 wherein the selector controls the second switches so that only one of the second switches is in the closed position at a time.

12. The imaging system as set forth in claim 10 wherein the selector controls the second switches so that at least two of the second switches are in the closed position at substantially the same time.

13. A method of bussing one or more of a plurality of current signals in an imaging system, the method comprising:

obtaining a plurality of voltage signals from respective sources thereof;

converting said plurality of voltage signals respectively into said plurality of current signals;

providing a common bus and a plurality of first switches, each of the first switches having a first position to couple one of the plurality of current signals to the common bus and a second position to disconnect the one of the plurality of current signals from the common bus; and controlling movement of each of the first switches between the first and the second positions.

14. The method of claim 13 further comprising converting incident radiation in an array of pixels to the plurality of voltage signals.

15. A multiple level bus system comprising:

a plurality of first level bus systems, each of the first level bus systems comprising:

at least one of first common bus for carrying one or more of a plurality of current signals;

two or more first switches, each of the first switches having a first position where one of the current signals is coupled to the first level common bus and a second position where the one of the current signals is disconnected from the first level common bus; and a first selector coupled to each of the first switches, the first selector controlling movement of each of the first switches between the first and second positions;

at least one second common bus for carrying one or more of the plurality of current signals from the first common busses;

two or more second switches having a first position where one the current signals from one of the first common buses is coupled to the second common bus and a second position where the one of the current signals is disconnected from the second common bus; and a second selector couple to each of the second switches, the second selector controlling movement of each of the second switches between the first and second positions.

16. The bus system as set forth in claim 15 wherein the first selector controls the first switches so that only one of the first switches is in the first position as a time.

17. The bus system as set forth in claim 15 wherein the second selector controls the second switches so that only one of the second switches is in the first position at a time.

18. The bus system as set forth in claim 15 wherein the first selector controls the second switches so that two or more of the first switches are in the first position at substantially the same time.

19. The bus system as set forth in claim 15 wherein the second selector controls the second switches so that two or more of the second switches are in the first position substantially the same time.

20. The bus system as set forth in claim 15 wherein each of the first switches is a switchable transconductor that converts a respective one of a plurality of voltage signals to one of the plurality of current signals and tat has the first position where one of the current signals is coupled to the common bus and the second position where the one of the current signals is disconnected from the common bus.

21. The bus system set forth in claim 15 further comprising two or more voltage-to-current transformers, each of the voltage-to-current transformers converting a respective one of a plurality of voltage signals to one of the plurality of current signals, each of the first switches couple between one of the voltage-to-current transformers and the first common bus in each of the first level bus systems.

22. The bus system set forth in claim 15 further comprising a first terminal bus in each of the first level bus systems, wherein each of the first switches in the second position couples the voltage-to-current transformers coupled so that the first switch to the first terminal bus in each of the first level bus systems.

23. The bus system as set forth is claim 22 wherein the first terminal bus is coupled to a first voltage source.

24. The bus system set forth in claim 15 further comprising a second terminal bus, wherein each of the second switches in the second position couples the first common bus coupled to tat first switch to the second terminal bus.

25. The bus system as set forth in claim 24 wherein the second terminal bus is coupled to a second voltage source.

26. The bus system as set forth in claim 21 further comprising two or more third switches in each of the first level bus systems, each of the third switches is coupled between one of the voltage-to-current transformers and one of the first switches in each of the first level bus systems, each of the third switches having an open position disconnecting one of the voltage-to-current transformers from one of the first switches and a closed position connecting one of the voltage-to-current transformers to one of the first switches in each of the first level bus systems.

27. The bus system as set forth in claim 26 wherein the first selector is coupled to each of the third switches, the first selector controlling movement of each of the third switches between the open and closed positions.

28. The bus system as set forth in claim 27 wherein the first selector controls the third switches so that only one of the third switches is in the closed position at a time.

29. The bus system as set forth in claim 27 wherein the first selector controls the third switches so that at lease two of the third switches are in the closed position at substantially the same time.

30. A method for multiple level bussing of one or more of a plurality of current signals, the method comprising:

providing a plurality of first level bus systems, each of the first level bus systems comprising a first common bus and a plurality of first switches, each of the first switches in each of the first level bus systems having a first position to couple one of the plurality of current signals to the common bus and a second position to disconnect the one of the plurality of current signals from the common bus;

controlling movement of each of the first switches between the first and second positions:

providing a second common bus and a plurality of second switches, each of the second switches having a first position to couple one of the plurality of current signals from at least one of the first common buses to the second common bus and a second position to disconnect the one of the first common buses from the second common bus; and controlling movement of each of the second switches between the first and second positions.

31. The method as set forth in claim 30 wherein only one of the first switches is in a first position at one time.

32. The method as sat forth in claim 30 wherein only one of the second switches is in a first position at one time.

33. The method as set forth in claim 20 wherein two or more of the first switches are in a first position at one time.

34. The method as set forth in claim 30 wherein two or more of the second switches are in a first position at one time.

35. The method as set forth in claim 30 further comprising converting respective voltage signals from a plurality of voltage signals into the plurality of current signals.

36. The method as set forth in claim 30 wherein each of the first switches in the second position is coupled to a first terminal bus.

37. The method as set font in claim 30 wherein each of the second switches in the second position is coupled to a second terminal bus.

\* \* \* \* \*

UNITED STATES PATENT AND TRADEMARK OFFICE
CERTIFICATE OF CORRECTION

PATENT NO. : 6,693,270 B2
DATED : February 17, 2004
INVENTOR(S) : Robert Iodice

It is certified that error appears in the above-identified patent and that said Letters Patent is hereby corrected as shown below:

Column 2,
Line 4, "modem" should read -- modern --

Column 18,
Line 49, "tat" should read -- that --

Column 19,
Line 4, "tat" should read -- that --

Signed and Sealed this

First Day of June, 2004

JON W. DUDAS
*Acting Director of the United States Patent and Trademark Office*